Figure 1:
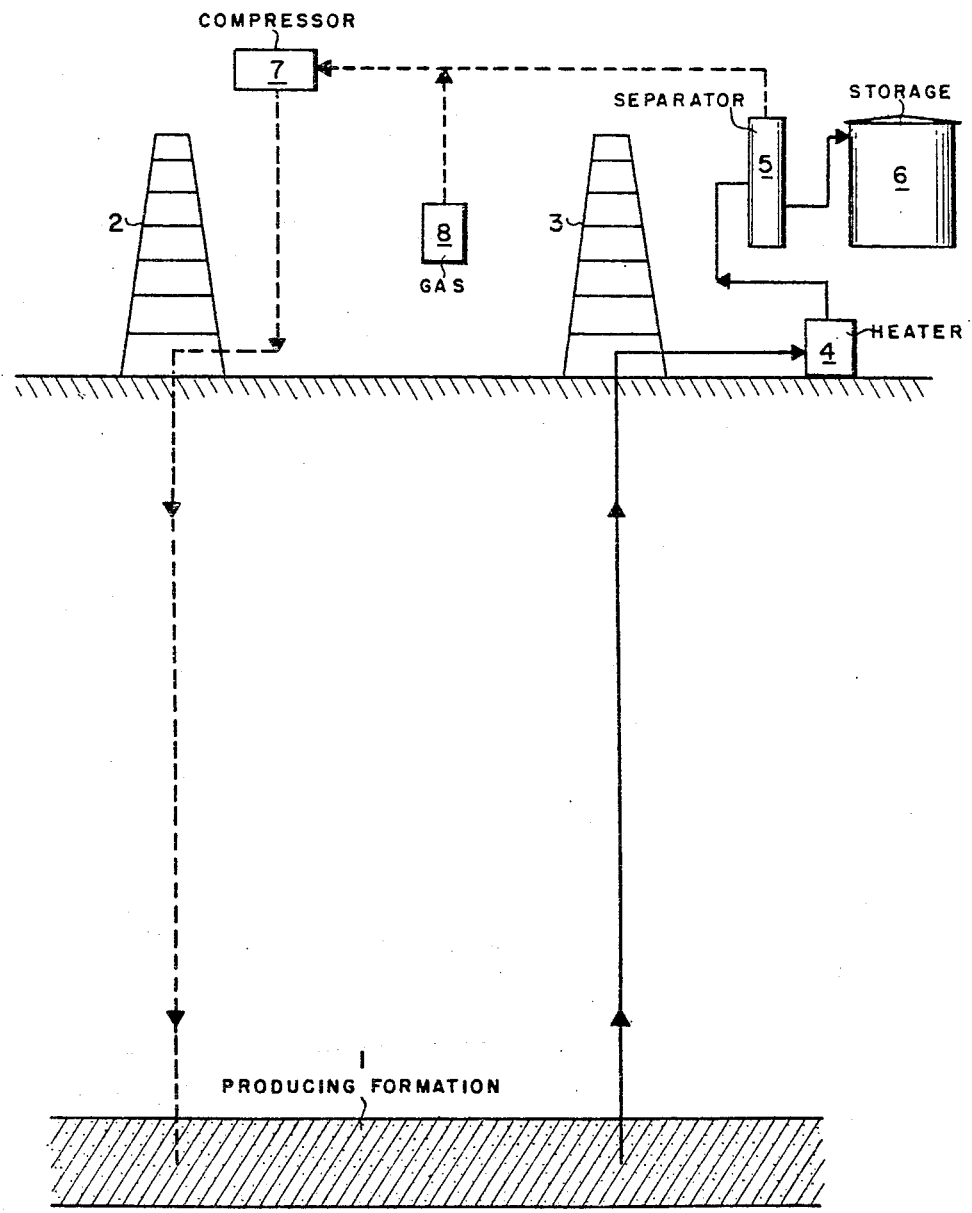

April 7, 1959            J. S. CRUMP            2,880,801

METHOD OF INCREASING RECOVERY OF OIL

Filed Oct. 3, 1956            5 Sheets-Sheet 1

*INVENTOR.*
JAMES S. CRUMP,

BY *John S. Schneider*

ATTORNEY.

EQUILIBRIUM PHASE BEHAVIOR FOR A SYSTEM OF METHANE, ETHANE-HEXANE AND HEAVIER AT CONSTANT TEMPERATURE AND PRESSURE.

April 7, 1959  J. S. CRUMP  2,880,801
METHOD OF INCREASING RECOVERY OF OIL
Filed Oct. 3, 1956  5 Sheets-Sheet 3

EQUILIBRIUM PHASE BEHAVIOR FOR A SYSTEM OF METHANE, ETHANE-HEXANE AND HEAVIER AT CONSTANT TEMPERATURE AND PRESSURE.

INVENTOR.
JAMES S. CRUMP,
BY John S. Schneider
ATTORNEY.

April 7, 1959 J. S. CRUMP 2,880,801
METHOD OF INCREASING RECOVERY OF OIL
Filed Oct. 3, 1956 5 Sheets-Sheet 4

EQUILIBRIUM PHASE BEHAVIOR FOR A SYSTEM OF METHANE, ETHANE-HEXANE AND HEAVIER AT CONSTANT TEMPERATURE AND PRESSURE.

INVENTOR.
JAMES S. CRUMP,
BY John S. Schneider
ATTORNEY.

April 7, 1959     J. S. CRUMP     2,880,801
METHOD OF INCREASING RECOVERY OF OIL Filed Oct. 3, 1956     5 Sheets-Sheet 5

OIL RECOVERY VERSUS FLUID INJECTED

INVENTOR.
JAMES S. CRUMP,
BY
ATTORNEY.

United States Patent Office 2,880,801
Patented Apr. 7, 1959

2,880,801

METHOD OF INCREASING RECOVERY OF OIL

James S. Crump, Houston, Tex., assignor, by mesne assignments, to Jersey Production Research Company, Tulsa, Okla., a corporation of Delaware Application October 3, 1956, Serial No. 613,740

6 Claims. (Cl. 166—9)

This invention concerns a method for increasing recovery of oil from subsurface reservoirs. More specifically, the invention concerns a method for increasing recovery of oil from subsurface formations by preferentially absorbing one or more components of an injected hydrocarbon mixture in the reservoir oil.

A modification of this invention involves injecting an inert gas into the reservoir after the oil in the reservoir has been enriched by preferential absorption of one or more components of the injected hydrocarbon mixture referred to above.

This application is a continuation-in-part of U.S. application Serial No. 494,627 filed March 16, 1955, in the name of James S. Crump, entitled "A Method of Increasing Recovery of Oil," now abandoned.

One method of recovering petroleum oil from natural reservoirs is to attempt to displace it with a fluid which is immiscible with said oil. When such a fluid is injected into a reservoir containing oil, part of the oil will not be displaced, but will be left in the portion of the reservoir invaded by the injected fluid. This oil is commonly called "residual oil." It is immobile or very nearly immobile, while the injection fluid with which it is in contact has high mobility. In other words, the flow velocity of the injected fluid is very much greater than that of the residual oil, and therefore it is not economical or practical to recover this residual oil by continued injection of the immiscible fluid. This residual oil, therefore, remains in the reservoir when said reservoir is abandoned.

I have discovered that the efficiency with which an injected hydrocarbon mixture displaces oil from a reservoir is greatly influenced by the composition of the displacing hydrocarbon mixture. When one or more components of the injected hydrocarbon mixture is absorbed in the liquid phase of the reservoir oil, recovery of the oil is increased appreciably. This absorption into the residual reservoir oil swells this liquid phase and this increases the oil saturation. This increased oil saturation effects an increase in the relative permeability to oil in the reservoir and thus aids the flow of oil toward the producing end of the reservoir. Further, a decrease in the residual oil viscosity results from the absorption phenomenon and this also leads to a more efficient recovery of oil.

In extreme cases, the injected fluid composition may be such that the preferential absorption of intermediates into the residual oil will so enrich this oil with said intermediates that the swollen residual oil will become miscible in all proportions with the injection fluid. It will be recognized by those skilled in the art that this behavior will lead to essentially 100% recovery of the original reservoir oil from the affected portions of the reservoir. The swelling of the liquid phase permits recovery of even heavy asphaltic base oils, the recovery of which heretofore has been ineffective.

Hence, an object of this invention is to provide a method for increasing the recovery of oil wherein a hydrocarbon mixture composition is selected so that component(s) thereof will be preferentially absorbed by the residual reservoir oil at the pressure and temperature of the reservoir when the hydrocarbon mixture is injected into the reservoir so that the hydrocarbon mixture enriches the residual reservoir oil.

Briefly, the method of this invention for recovering petroleum fluid containing petroleum liquid from a subsurface reservoir containing the petroleum fluid, the reservoir being provided with at least one injection well and at least one production well, comprises the steps of injecting into the reservoir through the injection well a hydrocarbon mixture containing methane and at least one intermediate hydrocarbon, the composition of the hydrocarbon mixture being such that when the hydrocarbon mixture contacts the residual petroleum liquid contained in the reservoir, the intermediate hydrocarbon in the hydrocarbon mixture will be preferentially absorbed by the petroleum liquid to thereby enrich the petroleum liquid, and withdrawing from the production well petroleum fluid originally present in the reservoir while the hydrocarbon mixture is being injected.

A modification of this invention also contemplates first injecting the hydrocarbon mixture into the reservoir similarly to the above method. However, in this instance the hydrocarbon mixture injection is maintained only until there is established adjacent to the injection well(s) a zone of fluid which will efficiently displace the petroleum fluids originally in the reservoir. Then the injection of the hydrocarbon mixture is discontinued and inert gas is injected while withdrawing the petroleum fluid originally present in the reservoir through the production well.

For purposes herein "inert gas" means any gas not capable of enriching the residual reservoir oil liquid phase with intermediate hydrocarbons. Thus, suitable gases that may be employed are, for example, methane, nitrogen, or air. "Intermediate hydrocarbons" is used herein to designate those hydrocarbons having more than one carbon atom per molecule but not more than about six carbon atoms per molecule.

Figure 2:
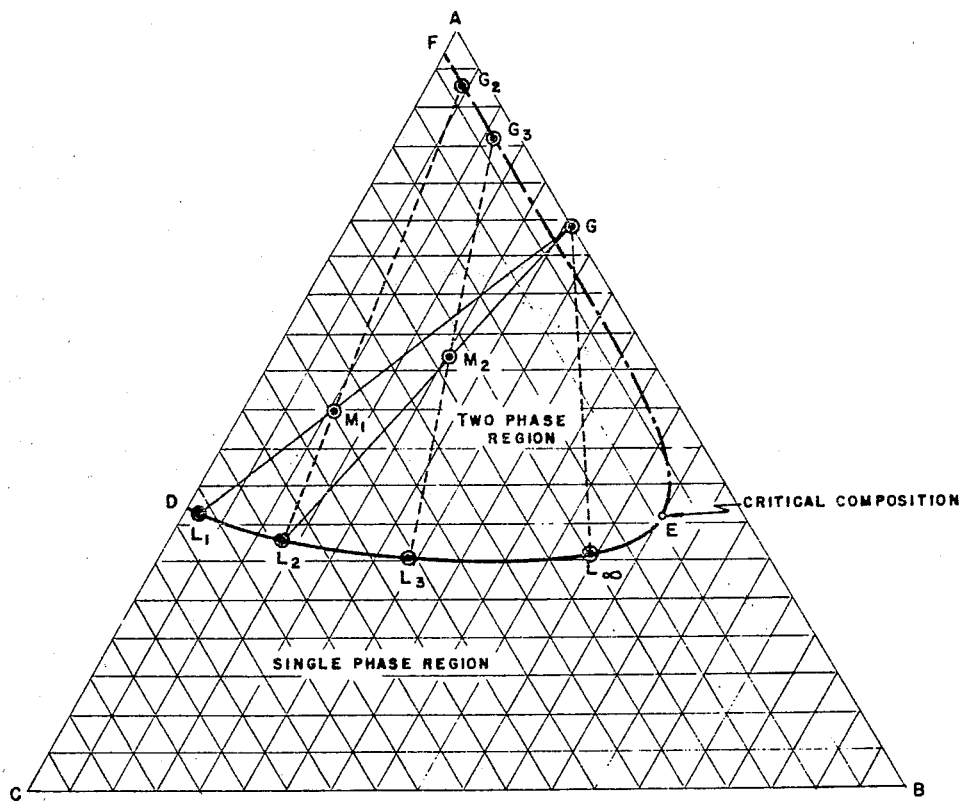
Figure 3:
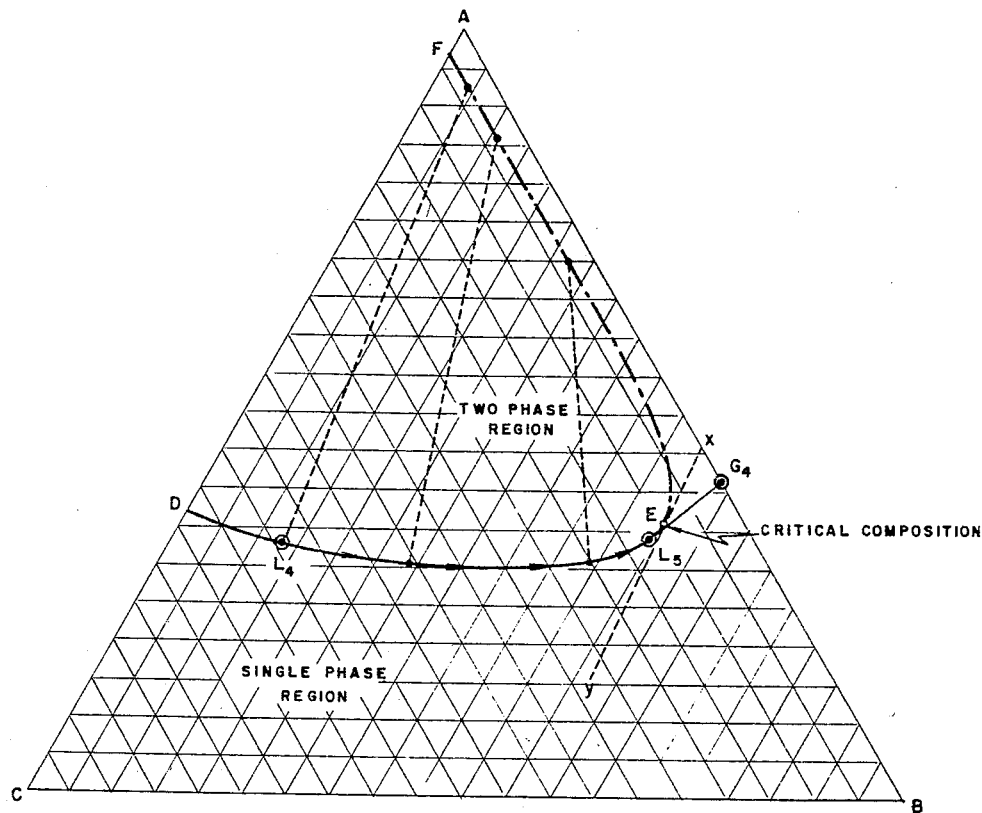
Figure 4:
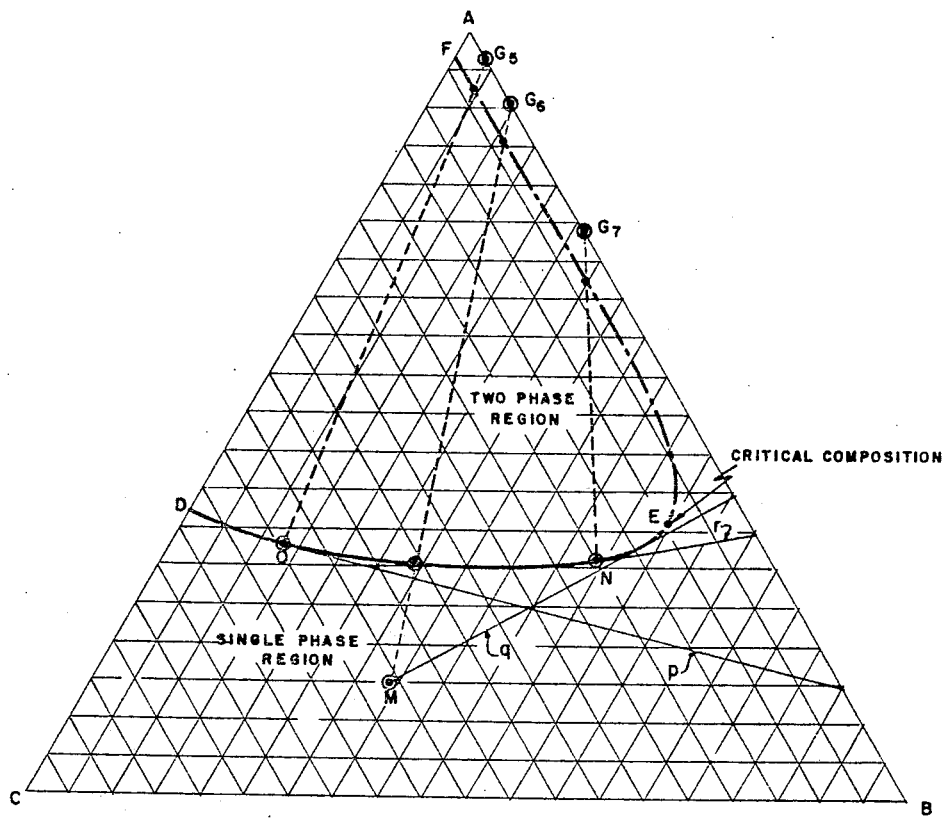
Figure 5:
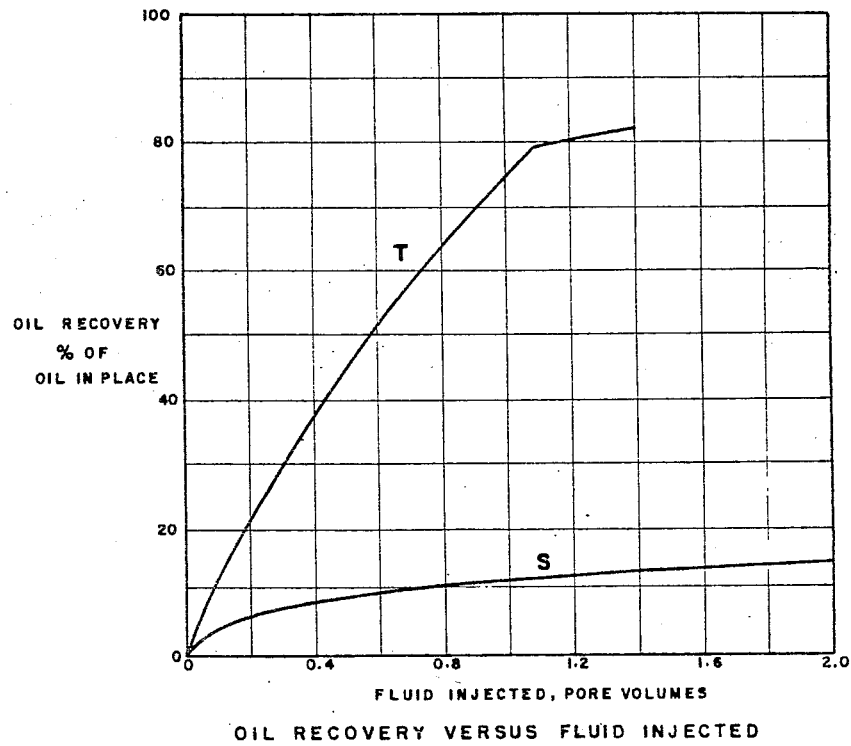

Referring briefly to the drawings,

Fig. 1 is a flow diagram illustrating one manner of employing my invention;

Fig. 2 graphically illustrates how the enrichment of the residual oil takes place in the reservoir;

Fig. 3 graphically illustrates a case in which the injected fluid composition is such that miscibility in all proportions may be achieved between the swollen residual oil and the injected hydrocarbon mixture;

Fig. 4 is a ternary phase equilibrium diagram triangular plot illustrating composition ranges suitable for use in the process of my invention; and Fig. 5 is a plot illustrating the invention of oil recovery versus fluid injected.

In detail, Fig. 1 shows an oil reservoir producing zone 1 containing petroleum fluid including petroleum liquid. A hydrocarbon mixture containing methane and at least one intermediate hydrocarbon is injected at reservoir temperature and pressure into producing zone 1 through the injection well 2. The hydrocarbon mixture-drive is maintained thereby displacing the petroleum fluid or oil to production well 3 where the oil is produced until maximum recovery has been obtained. In another manner of operation, instead of maintaining the hydrocarbon mixture-drive while producing oil from production well 3, the hydrocarbon mixture may be injected through injection well 2 only until there is established adjacent to the injection well(s) a zone of enriched petroleum fluid which will efficiently displace the petroleum fluids originally in the reservoir. The injection of the hydrocarbon mixture is then discontinued and an inert gas is injected through injection well 2 and then the inert gas drive is maintained thereby displacing the zone of enriched petroleum fluid and the petroleum fluid originally present in the reservoir. This displaces the petroleum fluid originally in the reservoir to production well 3 where it is produced. From the production well the produced petroleum fluid or oil may be sent to a heater 4 where the temperature is varied to any desired separator temperature. From the heater the oil is sent to a separator 5 where the oil and gas are separated. The oil is then sent to a storage tank 6 and the gas to a compressor 7 where the pressure is raised to the pressure of the producing zone. Between the separator and the compressor, gas 8 of any desired composition may be injected into the gas stream at any suitable temperature and pressure to make up any desired injection hydrocarbon mixture. The gas 8 may include condensate or separator gas from the same or other reservoirs or the gaseous products of cracking units (which could operate at the reservoir site) or natural gas. These gases may be used as the injection gas alone or they may be mixed in any proportions.

The hydrocarbon mixture from the compressor 7 containing methane and the intermediate components to be absorbed is sent to the injection well 2 and then into the production zone 1. In the modified method, after discontinuing injection of the hydrocarbon mixture, the inert gas may be sent from the gas source 8 to the compressor and thence to the injection well 2 from whence it passes into the producing formation 1.

To ascertain or determine the composition of the injection hydrocarbon mixture to be employed by the method of my invention with any given reservoir oil, a series of experiments are run on various injection hydrocarbon fluid or mixture compositions. In these experiments a sample of the reservoir oil is placed in a cell at any desired displacement pressure and at the reservoir temperature. The reservoir oil is then saturated with the hydrocarbon mixture to be injected; that is, the hydrocarbon mixture is added to the reservoir oil until the vapor pressure of the liquid phase is equal to the displacement pressure, but no gas phase is present. The saturated liquid phase is then analyzed. Then an additional increment of the hydrocarbon mixture is added. This increment contains a small amount of the injection fluid relative to the saturated liquid phase; for example, this amount may be less than $\frac{1}{20}$ of the number of moles of the saturated liquid phase. The resulting equilibrium liquid phase is then again analyzed. If the intermediate concentration in the liquid phase has increased, then intermediate components have been absorbed into the liquid phase and the hydrocarbon mixture is suitable for use in the present method. However, if the intermediate concentration has decreased, then intermediate components have vaporized into the gas phase. In this latter case, no preferential absorption of the intermediates by the oil occurred, hence this hydrocarbon mixture is not suitable for use in the present method. This analysis establishes the lower limit of intermediates relative to the methane which may be employed in accordance with this invention. The upper limit of intermediates relative to the methane which may be employed may be ascertained by determining whether or not the hydrocarbon mixture is miscible in all proportions with the reservoir oil at the reservoir temperature and at the reservoir pressure. That is, if the hydrocarbon mixture is miscible in all proportions with the reservoir oil at the reservoir temperature and the reservoir pressure, then the hydrocarbon mixture is richer in intermediates than required for the present method. Thus, a hydrocarbon mixture which has a composition lying within these two limits will be suitable for use in my method.

Between these two limits there may be a minimum concentration of intermediates in the injection fluid which will so enrich the residual oil by preferential absorption of intermediates that the swollen residual oil will become miscible in all proportions with the injected fluid. This minimum richness can be determined by running other series of experiments on various injection fluid compositions. In these experiments a small sample of reservoir oil (e.g., two cc.) is placed in a cell at any desired displacement pressure and at the reservoir temperature. This cell should be equipped with a sight glass which permits viewing the fluid contents of the top of the cell. The reservoir oil is then saturated with the hydrocarbon mixture to be injected; that is, the hydrocarbon mixture is added to the reservoir oil until the vapor pressure of the liquid phase is equal to the displacement pressure, but no gas phase is present. Then an additional increment of the hydrocarbons mixture is added and the resulting equilibrium gas is displaced and analyzed, if one exists. The volume of mixture added should be equal to that of the liquid in the cell. This last step is repeated until either the equilibrium gas phase displaced approaches a constant composition as each successive equilibrium gas is analyzed after each step or until no equilibrium gas phase exists. If the former is the case, it indicates that the composition of the liquid phase in the cell has absorbed as much of the intermediates from the injection fluid as is possible. This result indicates that the injection fluid is not capable of modifying the residual oil until the two are miscible in all proportions. On the other hand, if the point is reached where no equilibrium gas phase exists, this indicates that the oil has been modified until it is miscible in all proportions with the injection fluid.

Whenever the term "miscible in all proportions" is used in this specification and claims, with reference to equilibrium phase behavior of a mixture of an oil and a hydrocarbon mixture, it shall mean that only one phase can exist at equilibrium for all proportions of the oil and hydrocarbon mixture at the temperature and pressure imposed on the system. In contradistinction, "partial miscibility" means that the hydrocarbon mixture and the oil have only a limited solubility in one another and that certain mixtures of the two would result in two phases at equilibrium at the temperature and pressure imposed on the system.

For a more complete explanation of the operation of the invention, reference is now made to Figs. 2, 3 and 4. These figures graphically illustrate the ranges of intermediate hydrocarbons relative to methane that may be used in the hydrocarbon mixture to be injected in accordance with this invention. It is desirable to use triangular phase diagrams to describe the phase relationship of the mixtures consisting of the three components—methane ($C_1$), the intermediates ethane to hexane ($C_2$ to $C_6$), and the heavier petroleum fluids ($C_{7+}$).

It is realized that the arbitrary step of designating the hydrocarbons ethane through hexane as one single compound and also designating heptanes and heavier hydrocarbons as another single compound is not rigorous from the thermodynamic point of view. From a practical standpoint, however, this simplification aids in the qualitative explanation of the mechanics of this invention. Three-phase diagrams are explained in detail in the Chemical Engineers' Handbook, J. H. Perry, 3rd edition, McGraw-Hill, pages 719 and 720.

As described therein, the vertexes in a triangular phase diagram represent the pure components and the sides of the equilateral triangle are scaled to represent binary compositions of the three possible pairs. Ternary compositions are located within the triangle.

As noted in Figs. 2, 3 and 4, certain regions of the triangular diagram represent compositions which would divide into two phases at equilibrium, a liquid and a gas. The equilibrium gas of a mixture is referred to as the "dew point" gas and the equilibrium liquid is referred to as the bubble point or saturated liquid. The lines on the triangular diagram joining a dew point gas to the bubble point liquid with which it co-exists at equilibrium are designated "tie lines." The locus of points of the saturated liquids and dew point gases is called the binodal curve. The binodal curve separates the region of compositions which would divide into two phases from the region of compositions in which only one phase would exist. The binodal curve for any given system is affected by both temperature and pressure.

In Figs. 2, 3 and 4, the bubble point curve is shown by a heavy solid line and the dew point curve by a heavy dashed line. Equilibrium tie lines are shown as light dashed lines.

Figs. 2, 3 and 4 show a typical three component triangular diagram in which the vertexes A, B, and C arbitrarily represent, respectively, the hydrocarbon components $C_1$, $C_2$ through $C_6$, and $C_{7+}$. The sides of the equilateral triangle represent binary compositions of the three possible pairs of these components. Any point within the triangle represents a system with a specific composition made up of definite amounts of $C_1$, $C_2$ through $C_6$, and $C_{7+}$. The mol percent concentration of each component of such a system is determined by measuring the distance the point in the triangle lies from the sides of the triangle opposite the respective components. Therefore, for example, the point O in Fig. 4 represents a reservoir oil consisting of 33 mol percent $C_1$, 13 mol percent $C_2$–$C_6$, and 54 mol percent $C_{7+}$.

It is also a property of such ternary diagrams that if two fluids, such as G and $L_1$ in Fig. 2, are mixed together, the composition of the resulting mixture will be located on the ternary diagram on the straight line connecting G and $L_1$ (e.g., such a mixture might have a composition $M_1$). A further property of the diagram is that the distance $L_1M_1$ is inversely proportional to the amount of $L_1$ in the mixture, and the distance $M_1G$ is inversely proportional to the amount of G in the mixture.

An example of the way in which the residual oil is enriched by the absorption of intermediate hydrocarbons from the injection fluid is illustrated in Fig. 2. Let the fluid injected into the reservoir have a composition G and the original reservoir fluid have a composition $L_1$. The fluid injected first displaces physically a portion of the reservoir oil, but in so doing leaves behind some residual oil. The injected fluid then mixes with this residual oil to yield an overall fluid composition of, for example, $M_1$.

Since $M_1$ falls within the two phase region of the ternary diagram, it will separate into a gas and a liquid phase which are in equilibrium with each other. This gas and liquid are designated, respectively, by $G_2$ and $L_2$ and lie on the equilibrium tie line passing through $M_1$. Thus, the original liquid has had its composition modified from $L_1$, so that the residual oil now has the composition $L_2$ and is in contact with a gas $G_2$; however, since the residual liquid is relatively immobile while the gas $G_2$ is free to flow downstream, it is obvious that continued injection of the gas G will displace $G_2$ and bring liquid $L_2$ into contact with fresh gas G. When these two fluids mix, the resulting composition is, as shown, $M_2$ which will separate into a mobile gas $G_3$ and a residual liquid $L_3$. Again, the gas phase flows on downstream and fresh gas G comes into contact with liquid $L_3$. Thus, it is seen that eventually the residual liquid will approach a composition of $L_\infty$, which is the bubble point liquid lying on the equilibrium tie line, the extension of which also passes through injected fluid composition G. Thus the original liquid $L_1$ has absorbed sufficient intermediates to change its composition to $L_\infty$.

Fig. 3 graphically illustrates a case in which the injected fluid is sufficiently rich in intermediates to eventually achieve complete miscibility with the residual oil when the two are mixed in any proportion. Here the original liquid composition corresponds to point $L_4$, and the injected fluid composition corresponds to the point $G_4$. The dashed line XY is the limiting tie line; that is, the tie line passing through the composition at which the bubble point liquid composition approaches the composition of the dew point gas with which it is in equilibrium. This composition is known as the critical composition for this system at the pressure and temperature for which Fig. 3 applies. The tie line XY is tangent to the binodal curve at the critical composition. Similarly, as in the case illustrated in Fig. 2, it is seen that the residual liquid composition in this case travels from $L_4$ along the bubble point curve in the direction shown by the arrows until it reaches $L_5$. A straight line joining $L_5$ and $G_4$ does not pass through the two phase region of the diagram and there are no other points on the bubble point line between $L_4$ and $L_5$ for which this is true. This indicates that when the residual liquid composition in the zone adjacent to the injection well approaches $L_5$ this liquid will approach complete miscibility with the injection fluid. In this event, essentially 100% recovery will be achieved from those portions of the reservoir which are invaded by the injection fluid.

The minimum concentration of intermediates required to achieve complete miscibility with the residual oil may be illustrated by reference to Fig. 3. This minimum concentration is located at the intersection of the limiting tie line XY with the methane and $C_{2-6}$ axis. If the injection fluid is richer in intermediates than indicated by this intersection, then the interaction of it and the residual liquid will be similar to that shown by $L_5$ and $G_4$ in Fig. 3 and complete miscibility will be achieved. On the other hand, if it is leaner in intermediates, the interaction will be similar to that shown for $L_1$ and G in Fig. 2, and the residual liquid will approach some limiting composition $L_\infty$.

To illustrate by use of triangular equilibrium phase diagrams the entire range of compositions of hydrocarbon mixtures which would apply to my invention, three reservoir oils were chosen as shown in Fig. 4. The oil of composition O contained a small amount of intermediate hydrocarbons, the oil of composition M contained a moderate amount of intermediate hydrocarbons, and the oil of composition N contained a large amount of intermediate hydrocarbons. O and N lie on the binodal curve or saturated liquid line of the equilibrium phase diagram. These, therefore, represent reservoir oils which are saturated (i.e., are bubble point liquids) at the pressure and temperature for which Fig. 4 applies. On the other hand, M lies outside this curve; hence, the reservoir oil M is undersaturated at the reservoir conditions of temperature and pressure. The compositions of the reservoir oils O, M and N are tabulated in Table I.

*Table I*

|  | Comp. O, mol percent | Comp. M, mol percent | Comp. N, mol percent |
| --- | --- | --- | --- |
| $C_1$ | 33 | 15 | 31 |
| $C_2$ through $C_6$ | 13 | 34 | 49 |
| $C_{7+}$ | 54 | 51 | 20 |

The binodal curve designated D, E, F in the figures represents the boundary between the single phase and the two phase regions for a particular pressure and temperature.

The triangular diagram of Fig. 4 may be used to explain the lower limit of intermediates in the injection hydrocarbon mixture applicable to my recovery method for any reservoir oil. For example, $G_5$ represents a hydrocarbon mixture of intermediates and methane which contains the lowest amount of intermediates usable as the injection hydrocarbon mixture in my method for recovery of reservoir oil of composition O. $G_5$ is at a point on the axis of the $C_1$ and $C_{2-6}$ vertexes, which point is an extension of the tie line through point O. Any increase in the amount of intermediates would consequently result in a corresponding decrease in the percentage of methane. Thus, in accordance with the procedure discussed with reference to Fig. 2, the hydrocarbon mixture must be at least as great as 4% intermediates in order to obtain absorption of the intermediate components into the liquid phase instead of vaporization of the intermediate components from the liquid phase into the gaseous phase. Similarly, the compositions of the hydrocarbon mixture $G_6$ and oil M fall on the extension of a tie line and $G_7$ falls on an extension of a tie line through N. $G_6$ and $G_7$ represent hydrocarbon mixtures of intermediates and methane which contain the lowest amount of intermediates usable as the injection hydrocarbon mixture in my method for recovery of reservoir oils M and N, respectively.

It should be understood, however, that the injection mixture composition does not have to fall exactly on the axis of the $C_1$ and $C_{2-6}$ vertexes; it may contain small concentrations of $C_{7+}$, for example, less than 2 mol percent.

The upper limit of intermediates in the injection hydrocarbon mixtures applicable to my recovery method for any reservoir oil may be explained also by reference to Fig. 4. For example, lines $p$, $q$ and $r$ represent tangents to the binodal curve D, E, F at points O, M and N, respectively. For a reservoir oil of composition O, the intersection of line $p$ with the axis A—B represents the upper limit of $C_2$-$C_6$ that can be mixed with oil O and still produce two phases, that is, the upper limit of intermediates in the injection hydrocarbon mixture which can still result in partial miscibility. For example, the line $p$ intersects the axis A—B at 85%, $C_2$-$C_6$. A hydrocarbon mixture containing more than 85% of $C_2$-$C_6$ when mixed with the composition O would always result in a single phase; that is, the hydrocarbon mixture containing more than 85% of $C_2$-$C_6$ and less than 15% methane would be miscible in all proportions with the reservoir oil of composition O. The same principle applies to the lines $q$ and $r$ for reservoir oil compositions M and N, respectively. That is, the intersection of the A—B axis by these lines establishes the upper limit of the $C_2$-$C_6$ intermediates that may be employed in the injected hydrocarbon mixture of my invention for reservoir oils M and N, respectively.

Thus, recovery of reservoir oils O, M and N by the method of my invention would require the composition of the intermediates in the injection hydrocarbon mixture to be between 4% and 85%, 10% and 61%, and 27% and 65%, respectively.

A description of the laboratory displacement experiments which emphasize the high recoveries obtainable by the method of this invention follows. An oil was displaced from a horizontal sand-packed steel tube by injection of fluids at a constant displacement pressure of 1500 p.s.i.g., while a constant temperature was being maintained on the tube. The oil consisted of a mixture of heavy refined white oil saturated with methane at a pressure of 1500 p.s.i.g. and at a temperature equal to that maintained on the sand-packed tube. At these conditions of pressure and temperature, this liquid mixture had a viscosity of 44 cp. This viscosity, coupled with the liquid being saturated, made it very difficult to recover this oil from the tube by conventional displacement techniques.

Conventional injected gas drive displacement, consisting of injection of methane at one end of the reservoir while producing oil from the other end, gave the recovery history shown by curve S of Fig. 5. Recovery of the oil originally in the reservoir is shown as a function of the quantity of fluid injected into the reservoir. Recovery was poor, amounting to only 13% after injection of 1.2 pore volumes of gas. One pore volume of gas is defined as a volume equal to the volume of oil originally in the tube reservoir at the pressure and temperature of the displacement. Conventional injected water drive displacement gives better recovery, approximately 49% after injection of 1.2 pore volume of water, but even this still leaves much of the oil in the reservoir.

In contrast to these low recoveries, application of the method of this invention gave a recovery of 80% at 1.2 pore volumes of fluid injected, as shown by curve T in Fig. 5. In the experiment represented by curve T, the injection fluid was 42% propane and 58% methane. Phase behavior data of the type shown in Figs. 2, 3, and 4 indicated that this fluid was not rich enough in propane to achieve completely miscibility with the swollen residual oil. Therefore, by utilizing a richer fluid, even higher recovery would have been achieved.

Obviously this invention has advantages over all known methods of recovering oil since by properly selecting the composition of the injected hydrocarbon mixture, swell- and enhanced recovery of oil can be obtained without regard to pressure of the injected fluid other than the obvious characteristic of being sufficiently high to cause displacement of the oil originally present in the reservoir. This is an especially desirable feature since in many instances methods employing pressures substantially greater than the reservoir pressures during gas injection cannot be used because such pressures may cause lifting of the overburden, interfere with a water leg or drive, or otherwise produce undesirable effects. However, to effect efficient displacement of the reservoir oil, the reservoir pressure should preferably be maintained near the original reservoir pressure.

Having fully described the nature, objects and operation of my invention, I claim:

1. A method of recovering petroleum fluid containing petroleum liquid from a subsurface reservoir containing said petroleum fluid, said reservoir being provided with at least one injection well and at least one production well comprising the steps of injecting into said reservoir through said injection well a predetermined hydrocarbon mixture comprising a mixture of methane and at least one intermediate hydrocarbon at a pressure greater than the reservoir pressure in order to displace reservoir fluids toward said production well, the concentration of the intermediate hydrocarbons in the injection mixture being within a predetermined range, the upper limit of said range being determined experimentally by adding successive increments of a hydrocarbon mixture having a selected ratio of methane to intermediate to a sample of petroleum liquid maintained at said reservoir pressure and reservoir temperature to determine if said hydrocarbon mixture is completely miscible with said petroleum liquid and thereafter repeating the said experiment by adding mixtures of other selected ratios of methane to intermediate to other samples of said petroleum liquid until the minimum concentration of intermediate in the methane-intermediate mixture is determined which will cause the mixture to be completely miscible with said petroleum liquid, said upper limit of injection mixture concentration being equal to said minimum concentration, the lower limit of said range being determined experimentally by first saturating a sample of petroleum liquid maintained at said reservoir pressure and temperature with a mixture having a selected ratio of methane to intermediate and thereafter contacting said sample with successive increments of said mixture to determine whether said sample, will retain any intermediate by preferential absorption and thereafter repeating the said experiment by contacting other samples of said petroleum liquid with mixtures having other selected ratios of methane to intermediate until the minimum concentration of intermediate in a mixture is determined which when contacted with a sample of said petroleum liquid will so modify said sample by preferential absorption of intermediate that said hydrocarbon mixture becomes miscible in all proportions with said modified sample, said lower limit of injection mixture concentration being equal to said minimum concentration; and withdrawing the petroleum fluid from said production well.

2. A method as recited in claim 1 wherein the pressure of the reservoir is maintained substantially at the saturation pressure of the reservoir liquid.

3. A method as recited in claim 1 including injection of inert fluid following injection of said predetermined hydrocarbon mixture.

4. A method of recovering petroleum fluid containing petroleum liquid from a subsurface reservoir containing said petroleum fluid, said reservoir being provided with at least one injection well and at least one production well comprising the steps of injecting into said reservoir through said injection well a hydrocarbon mixture comprising a mixture of methane and at least one intermediate hydrocarbon in a predetermined concentration at a pressure greater than the reservoir pressure in order to displace reservoir fluids toward said production well, the predetermined concentration of the intermediate hydrocarbon in the injection mixture being determined experimentally by first saturating a sample of petroleum liquid maintained at reservoir pressure and reservoir temperature with a mixture having a selected ratio of methane to intermediate and thereafter contacting said sample with successive increments of said mixture to determine whether said sample will retain any intermediate by preferential absorption and thereafter repeating the said experiment by contacting other samples of said petroleum liquid with mixtures having other selected ratios of methane to intermediate until the minimum concentration of intermediate in a mixture is determined which when contacted with a sample of said petroleum liquid will so modify said sample by preferential absorption of intermediate that said hydrocarbon mixture becomes miscible in all proportions with said modified sample, said predetermined intermediate concentration in the injection mixture being substantially equal to said minimum concentration; and withdrawing the petroleum fluid through said production well.

5. A method as recited in claim 4 wherein the pressure of the reservoir is maintained substantially at the saturation pressure of the reservoir liquid.

6. A method as recited in claim 4 including injection of inert fluid following injection of said predetermined hydrocarbon mixture.

References Cited in the file of this patent

UNITED STATES PATENTS

| | | |
|---|---|---|
| 2,412,765 | Buddrus et al. | Dec. 17, 1946 |
| 2,742,089 | Morse et al. | Apr. 17, 1956 |

FOREIGN PATENTS

| | | |
|---|---|---|
| 696,524 | Great Britain | Sept. 2, 1953 |